Figure 1:
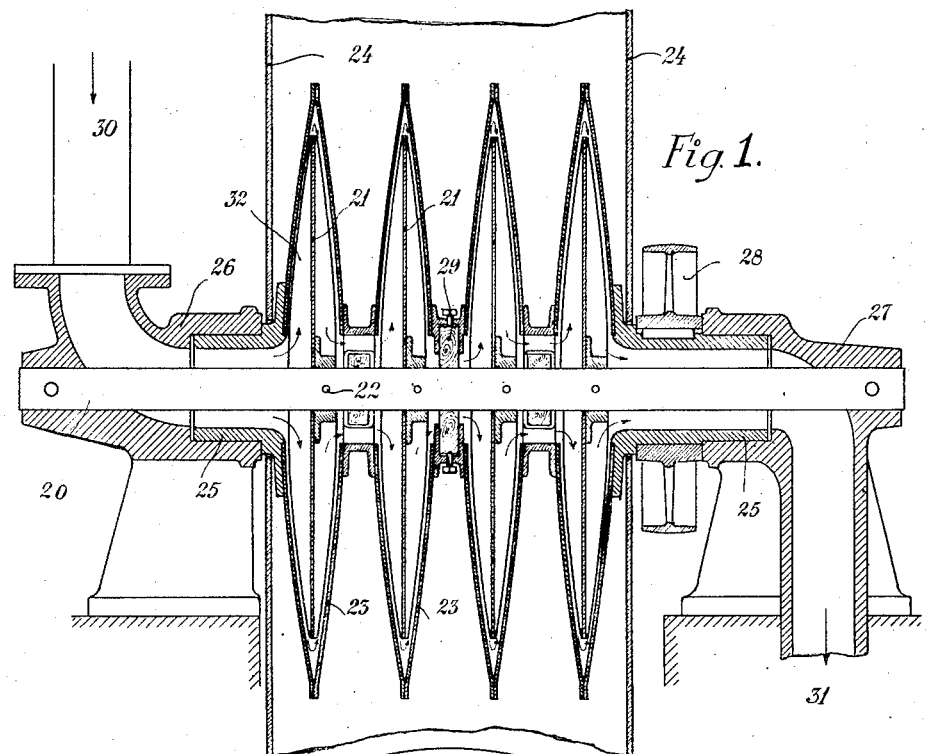

Jan. 17, 1928.

G. O. W. HEIJKENSKJÖLD 1,656,790

HEAT EXCHANGE APPARATUS

Filed May 28, 1923

Inventor:
Gustaf Olof Wolfgang
Heijkenskjöld,
By: Knight Bros.
Attys.

Patented Jan. 17, 1928.

1,656,790

UNITED STATES PATENT OFFICE.

GUSTAF OLOF WOLFGANG HEIJKENSKJÖLD, OF LIDINGO-BREVIK, SWEDEN.

HEAT-EXCHANGE APPARATUS.

Application filed May 28, 1923, Serial No. 642,100, and in Sweden May 31, 1921.

In transmission of heat from a gaseous or liquid fluid to another it has hitherto been usual to conduct said fluids through channels separated from each other by means of partitions, the heat being transmitted from the one fluid to the partition, through said partition and further to the other fluid. The quantity of heat thus transmitted is, as known, equal to the area of the surface through which the heat transmission takes place, multiplied by a certain coefficient of heat transmission and by the temperature difference between the fluids. Consequently, for the transmission of a certain quantity of heat at a certain temperature difference an area of heat transmission is required the size of which is inversely proportional to the value of the coefficient of heat transmission.

The value of said coefficient is in a high degree dependent upon the velocity with which said fluids pass the surface through which the heat transmission takes place. If said velocity is low, the value of the coefficient is also low, said value increasing, however, very rapidly with an increasing velocity.

Generally the velocities of the fluids past the surface of heat transmission are very slow and decrease rapidly towards the walls of the channels at which they tend towards zero. This holds true especially for gaseous fluids where the transmission of heat to or from the heat transmitting surface is very deficient owing to said reasons, and consequently very large areas of heat transmission are required.

These circumstances cause great drawbacks especially in arrangements for utilizing the heat of flue gases from boilers or the like for the preheating of feed water, air or the like, such apparatuses occupying a very great space and being very expensive owing to the large areas of heat transmission required.

The present invention has for its object to remove these drawbacks and consists in the heat transmission from the one fluid to the other taking place through one or more discs or the like which are in motion in relation to one or both fluids for the purpose of effecting a better value of the coefficient of heat transmission between said discs and the fluid or fluids.

If, for instance, heat is to be transmitted from a gaseous fluid to a liquid fluid or vice versa, the transmission of heat between the wall and the liquid fluid is considerably better than that between the gaseous fluid and the wall, and in such a case it may therefore be suitable to apply the invention in such a way that the wall is in a rapid motion only in relation to the fluid of the lower coefficient of heat transmission, whereas a less rapid or no motion is present in relation to the other fluid according to the value of the coefficient of heat transmission. By this means it is always possible to absorb on one side a quantity of heat equal to that which may be given off on the other side, while utilizing effectively the surface of heat transmission and the temperature difference.

The invention will be described more fully with reference to the accompanying drawings showing diagrammatically a preferred embodiment of the invention. Fig. 1 shows a longitudinal section of the preferred embodiment and Fig. 2 an end view of Fig. 1 with one of the drum halves removed.

Figure 2:
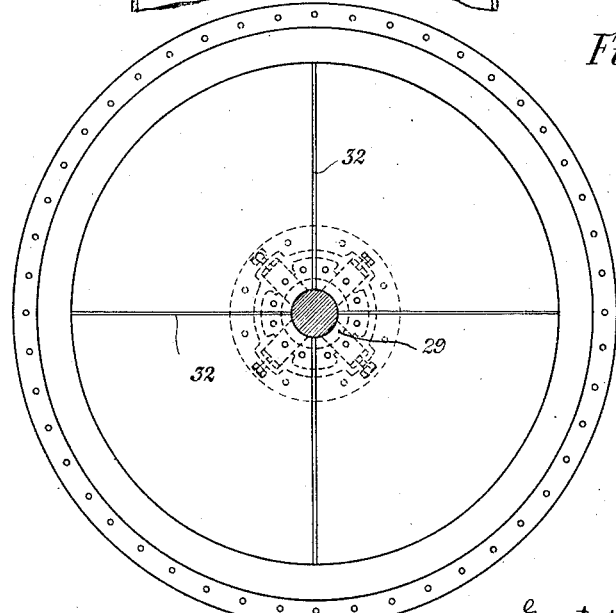

In Figs. 1 and 2 an embodiment of the invention is shown in which mixing of the two fluids is fully guarded against. In these figures 20 designates a stationary shaft on which discs 21 are fixedly mounted by means of pins 22 or the like. Around these discs a plurality of casings 23 are rotatably mounted in the channel of the one fluid, formed by the walls 24. These casings 23 are journalled at 25 in the brackets 26 and 27 respectively and are rotated by means of an outer force which for instance operates the pulley 28. In many cases it is preferred to provide bearing blocks 29 for instance of pock-wood for carrying the rotating casings 23. Said blocks have to be so arranged that there is a sufficient area of passage between the same for the fluid passing through the casings. Such an arrangement of bearing blocks is suitable especially if this last-mentioned fluid is a liquid, for instance water. The fluid passing through the casings enters at 30 and passes in the direction of the arrows round the edge of the discs 21 etc. and out through the outlet 31. In order to prevent this fluid from following the rotation of the casings 23, ribs 32 are provided on the sides of the discs 21 as shown in Fig. 2.

This embodiment is very suitable in case of transmitting heat from a gaseous fluid to a liquid fluid, the latter being preferably conducted through the casings 23.

The casings may in several cases be mounted in bearings arranged on the outside, the bearings being then preferably arranged between some of the different chambers.

In many cases it may be preferable to provide the rotation discs with vanes or the like for propelling the fluids through the apparatus.

In many cases it may be important that no leakage takes place in one direction. In such a case one fluid may be kept at a higher pressure than the other.

In order to prevent a layer of the fluid from following the rotation of the rotating part, said part may be formed with corrugations arranged for instance spirally or radially, whereby this layer will be permanently removed from the rotating part, thus ensuring a good equalization of temperature.

What I claim as new and desire to secure by Letters Patent of the United States is:—

1. Apparatus for transmitting heat from a gaseous fluid to a liquid comprising a rotating casing means to pass a liquid through said casing, a stationary guide partition in said casing to effect a tortuous passage of liquid therethrough and means to pass a gaseous fluid past the outer sides of said casing.

2. Apparatus for transmitting heat from a gaseous fluid to a liquid comprising a rotating casing, means to effect a tortuous passage of liquid through said casing, means to prevent liquid passing through the casing from following the rotation of the casing, and a passageway for a gaseous fluid along the outer side of said casing.

3. Apparatus for transmitting heat from one fluid to another comprising a channel for the passage of gaseous fluid, a plurality of casings rotatably mounted therein and having openings for the passage of a second fluid therethrough, a stationary shaft extending through the center of rotation of the casings and stationary guide members mounted on said shaft and extending into said casings to effect a tortuous flow of fluid therethrough.

4. Apparatus for transmitting heat from one fluid to another comprising a plurality of casings rotatably mounted, a stationary disc in each casing adapted to lead the medium traversing each casing from the interior between a rotating wall and the disc, over the edge of the latter, and again between the disc and another rotating wall towards the interior, and stationary blades in each casing adapted to prevent the medium which traverses the casing from taking part in the rotation of the same.

5. In an apparatus for transmitting heat from a gaseous fluid to a liquid, a channel for said gaseous fluid, a rotatable casing in said channel comprising a channel for said liquid, and means in said rotatable casing for preventing the liquid traversing said second channel from following the rotation of the casing.

6. An apparatus for transmitting heat from a gaseous fluid to a liquid comprising a rotating casing, means to pass a liquid through the casing, means to prevent the liquid passing through the casing from following the rotation of the casing, and a passageway for a gaseous fluid along the outer side of said casing.

7. Apparatus for transmitting heat from one fluid to another comprising a rotatably mounted casing, disc-like means in said casing adapted to lead the medium traversing said casing from the interior between a rotating wall and the disc-like means, over the edge of the latter, and again between the latter and another rotating wall towards the interior, and means in said casing adapted to prevent the medium which traverses the casing from taking part in the rotation of the same.

8. Apparatus for transmitting heat from one fluid to another comprising a channel for the passage of one fluid, a casing rotatably mounted therein and having openings for the passage of a second fluid therethrough, a stationary shaft extending through the center of rotation of the casing, and stationary disc-like guide means mounted on said shaft extending into said rotatably mounted casing and adapted to lead the medium traversing the casing from the interior between a rotating wall and the disc-like means, over the edge of the latter, and again between the latter and another rotating wall towards the interior.

In testimony whereof I affix my signature.

GUSTAF OLOF WOLFGANG HEIJKENSKJÖLD.